United States Patent [19]

Alexander

[11] 4,015,625
[45] Apr. 5, 1977

[54] HYDRAULIC MATERIALS HANDLING SYSTEM

[75] Inventor: Danrick W. Alexander, Fairmont, W. Va.

[73] Assignee: Continental Oil Company, Ponca City, Okla.

[22] Filed: Dec. 29, 1975

[21] Appl. No.: 644,354

[52] U.S. Cl. .................. 137/355.2; 137/355.17; 137/615; 248/58
[51] Int. Cl.² .............................. F16L 3/00
[58] Field of Search ............... 137/355.16, 355.24, 137/615, 355.17, 355.2; 212/55, 56; 248/55, 58

[56] References Cited

UNITED STATES PATENTS

| | | | |
|---|---|---|---|
| 508,786 | 11/1893 | Tower | 137/355.16 |
| 2,650,718 | 9/1953 | Palmer | 212/56 |
| 3,459,222 | 8/1969 | McElroy | 137/615 |
| 3,670,930 | 6/1972 | Irie | 137/615 X |
| 3,884,528 | 5/1975 | Shaddock | 137/355.24 X |

Primary Examiner—Alan Cohan
Assistant Examiner—Gerald A. Michalsky
Attorney, Agent, or Firm—William J. Miller

[57] ABSTRACT

An overhead support apparatus for a slurry hose transportation system has a monorail anchored to a support system a predetermined distance above the surface of the earth. A plurality of spaced rollers are movably engaged and supported by the support system. A slurry hose is attached to the plurality of spaced rollers by means of a plurality of beams, each of which has pivotally attached hose supporting clamps spaced along the beam. The apparatus may further include a brake for restraining a beam until the particular section of hose supported by the beam is under tension. A cable is also provided for retracting the plurality of beams to a storage area as required by the use of the slurry transportation system.

5 Claims, 8 Drawing Figures

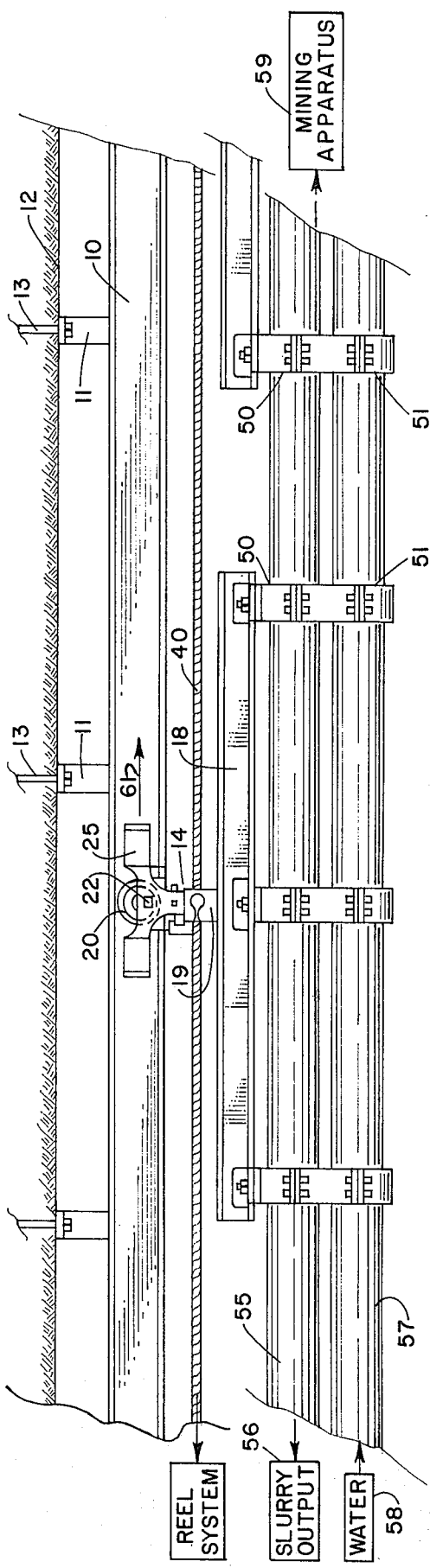
FIGURE 1
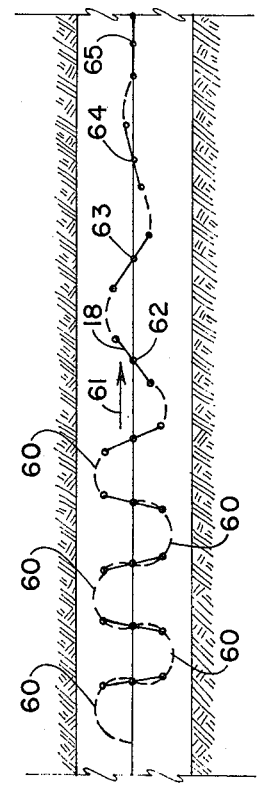
FIGURE 6
FIGURE 7
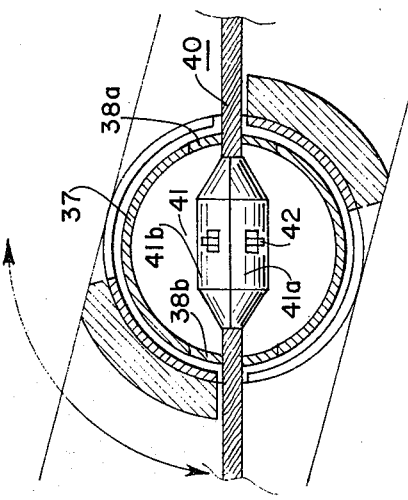
FIGURE 5

HYDRAULIC MATERIALS HANDLING SYSTEM

BACKGROUND OF THE INVENTION

A patent to Eric H. Reichl, U.S. Pat. No. 3,260,548 is the basic patent on the method and apparatus for continuously mining and transporting coal by means of an hydraulic system which is coupled to a slurry hopper through flexible pipes. The coal when mined is deposited into the slurry hopper, mixed with water, and pumped out of the mine.

Application Ser. No. 520,685, filed Nov. 4, 1974, now U.S. Pat. No. 3,941,425, titled "Mobile Slurry Handling System" by the same inventor is an improvement over the above referenced patent and specifically deals with the hose transportation system used to support the flexible slurry line.

Application Ser. No. 462,153, filed Apr. 18, 1974, now U.S. Pat. No. 3,920,039, titled "Monorail Support Apparatus for a Slurry Transportation System" by Jamison and Coval describes a slurry transportation system which is supported by a monorail.

All of the above applications require a complex conveyor means for moving the stored slurry hose system out of storage and into active use or vice versa.

The U.S. Pat. Nos. 3,820,351 to Arthur Pascuzzi; 3,721,260 to Stahmer; 2,853,026 to Paul; 2,571,832 to Chapin, Jr.; 3,289,983 to Mennerdahl; 2,205,665 to Peters; and 2,858,381 to Goldberg et al each discloses a monorail system for supporting a flexible member as a conduit or a wire. Such support systems would be unsatisfactory for a slurry transportation system since each supports the flexible member at one point and lets the flexible member droop between the support points. In a slurry transportation system, this method of support would result in the pumping system requiring additional pressure to pump the slurry up the loop at each support point. Furthermore, if the slurry system were shut off for any reason, the slurry would settle out at the bottom of each loop rendering it virtually impossible to start up the slurry system again since the fines would consolidate at the bottom of the loops forming a virtually impregnable plug.

Brief Description of the Invention

This invention supports the slurry hose transportation system in a horizontal attitude so that the flexible conduit, whether in storage or in use, will maintain its axis substantially horizontal. Thus in the case of shutdown any settling will occur along the length of the pipe permitting easy restart of the transportation system.

The invention essentially consists of a monorail having a plurality of support rollers attached to the underside of the monorail. A beam is pivotally attached to each of the support rollers. Hose clamps are attached along the beam and to the hose or flexible conduit. A cable passes through each of the support means so that the entire slurry line can be retracted by pulling on the cable. As the system is being retracted, the beams will rotate causing the slurry hose to take an S type configuration.

As the mining machine requires more hose to penetrate deeper into the mine, each section of hose is released individually by the release of a restraining means, such as a brake which engages the side of the monorail. Without some form of restraining means, when the hose is under pressure, the entire system would tend to reach the position of least resistance causing each one of the beams to move forward as the mining machines moves forward.

BRIEF DESCRIPTION OF THE FIGURES

Referring to the Figures,

FIG. 1 is a side view of a portion of a slurry transportation system;

FIG. 5 is a cross sectional view of FIG. 3 taken through lines 5—5;

FIG. 6 is a diagrammatical view illustrating the transition from storage to active use of the monorail system;

FIG. 7 is a diagrammatical view of a compact storage of the transportation system; and, FIG. 8 is a perspective drawing of the beam support apparatus illustrating the manner of attachment of the hose clamps.

DETAILED DESCRIPTION OF THE INVENTION

Figure 4:
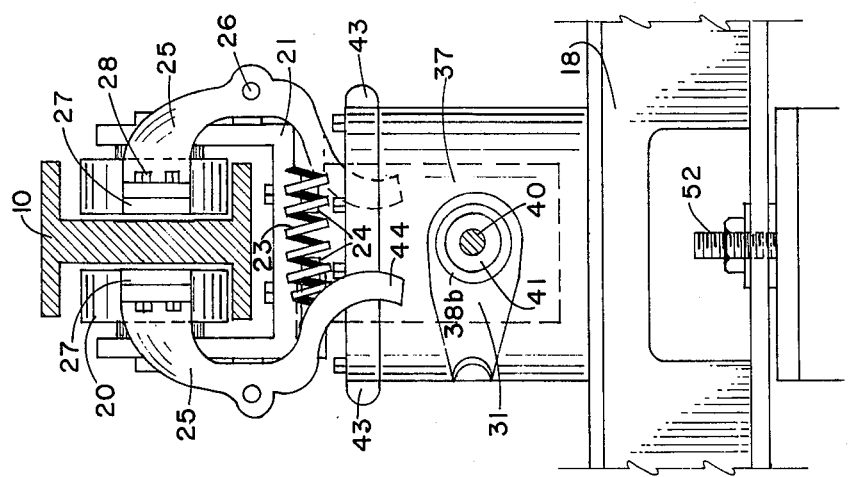
FIG. 4 is an end view of FIG. 1 with the beam support system rotated 90°.
Figure 3:
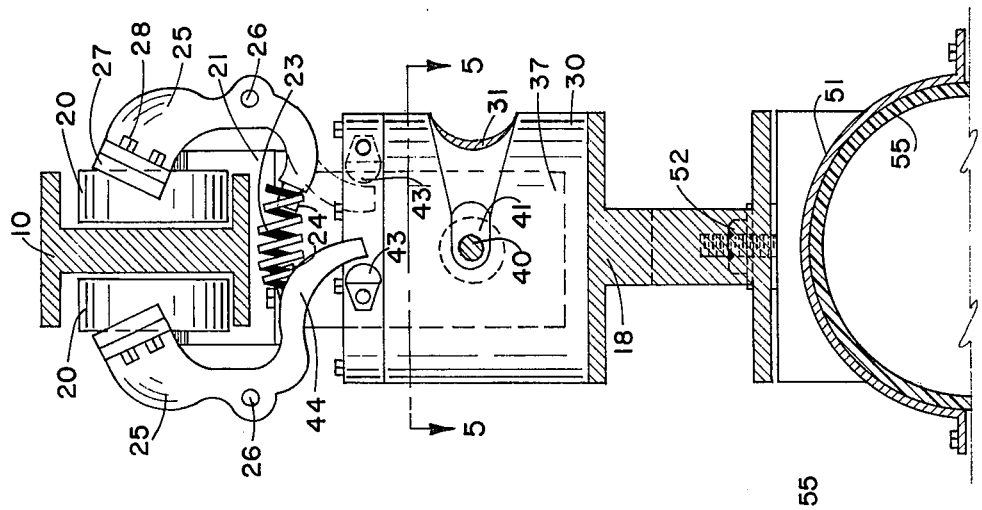
FIG. 3 is an end view of the beam support system taken through lines 3—3 of FIG. 2.

Similar numbers will be used for similar items throughout the specification.

Referring to FIGS. 1–5 but in particular to FIG. 1, a monorail 10 is attached through a support 11 to a mine roof 12 for example, through use of roof bolts 13. The monorail usually is an I beam and can be made out of steel or aluminum. The monorail 10 will be placed in the mine from the storage area to the use area and sections will be added as the mining machine progresses into the seam. Attached periodically along the monorail are a plurality of support systems 14. Each support system essentially comprises a beam 18, a cylindrical mount generally referred to by arrow 19, and a pair of rollers 20 which are journaled to a U-shaped mount which is attached to cylindrical mount 19. Rollers 20 are journaled to U-shaped mount 21 through a shaft 22.

A restraining system comprises a pair of brake arms 25 which is attached through pivots 26 to U-shaped mount 21. Each brake arm 25 has a brake shoe 27 attached thereto by some means such as bolts 28. A biasing spring 23 is mounted between the brake arms 25 and retained by spring retainers 24 which are formed as an integral part of brake arms 25. The spring is a compression spring having sufficient forces to apply brake shoes 27 against monorail 10 with sufficient force to restrain movement of the assembly along monorail 10 when the assembly is in the storage position.

Cylindrical mount 19 comprises an outer shell 30 which has a tapered opening 31 in its periphery. A disc 32 is attached to outer shell 30 by means such as bolts 33. A bearing referred to generally by arrow 34 has one race 35 attached to disc 32 and a second race 36 attached to a cylindrical inner mount 37. Inner mount 37 is attached to U-shaped mount 21. Inner mount 37 has an opening formed by a pair of circular holes 38a and 38b therethrough which is axially aligned with tapered opening 31.

A cable 40 has a dog referred to by arrow 41 clamped thereon. Dog 41 may comprise two halves, 41a and 41b, which are bolted together by bolt 42. Dog 41 is generally in the shape of a cylinder having tapered ends and has a diameter less than the diameter of hole 38a or 38b and will pass freely through the opening unless trapped in a method to be later described. Disc 32 has a pair of cam actuators 43 which will engage arms 44 upon sufficient angular rotation of disc 32.

The beam 18 which supports the slurry hose (see FIGS. 1 and 6) essentially comprises upper hose clamps 50 and lower hose clamps 51. It is obvious, of course, that if a single hose is being supported, only upper hose clamps 50 would be used. Hose clamps 50 or 51 essentially are severable into two parts, 50a and 50b and 51a and 51b, respectively. Each upper clamp 50 is attached to beam 18 at its outer end by a bolt 52 which is mounted through a slot 53 in the lower portion of beam 18. Center upper mount 50 is pivotly attached through a bolt 52 through a hole (not shown).

The hose system shown in FIG. 1, in one contemplated use of the invention, has an upper hose 55 connected to the slurry output 56 from the mine. A lower hose 57 is connected to a source of water 58. Both hoses 55 and 57 are connected to the mining apparatus 59.

Operation

Referring to FIGS. 1–5 and FIG. 8. The function of the apparatus will be described. Its operation for a flexible hose support system will be described with reference to FIGS. 6 and 7. Referring in particular to FIG. 1, hoses 55 and 57 are supported through upper and lower hose clamps 50 and 51 maintaining the axis of the hoses substantially horizontal. The space between the hose clamps and the length of beam 18 is primarily determined by the nature of the hoses being supported. The length of beam 18 is also determined by the environment where the system is used. For example, in a mine, the beam including the bend of the hose should be less than the width of the mine tunnel. Where the use does not require a finite width longer beams 18 can be employed. As mining machine 59 progresses into the mine, the hose will move axially with respect to monorail 10. This axial movement is accommodated by roller 20. The system is normally in a stored condition such as that illustrated in FIG. 7 or loops 60 of FIG. 6. As additional length of hose is required, the mining machine will cause movement in the direction of arrow 61 (see FIGS. 1 or 6). Movement in the direction of arrow 61 will cause a torque on beam 18 at location 62, for example.

Beam 18 in the stored position, that is the position illustrated by loops 60 in FIG. 6, is illustrated in FIG. 4. In this position, cam actuators 43 are out of contact with arms 44; therefore, brake shoes 27 are in contact with the side wall of monorail 10. In this position, rollers 20 are not free to move along monorail 10. The braking force will tend to maintain each beam 18 in a storage position along the monorail until the portion of stored hose being supported by beam 18 is needed. Without some form of restraining means the entire hose system will act as a spring which will cause the system to assume an attitude where all the forces acting along the hose system will tend to be equal. Such a situation would cause the entire system to elongate as hose were used rather than the last loop in the system.

Figure 2:
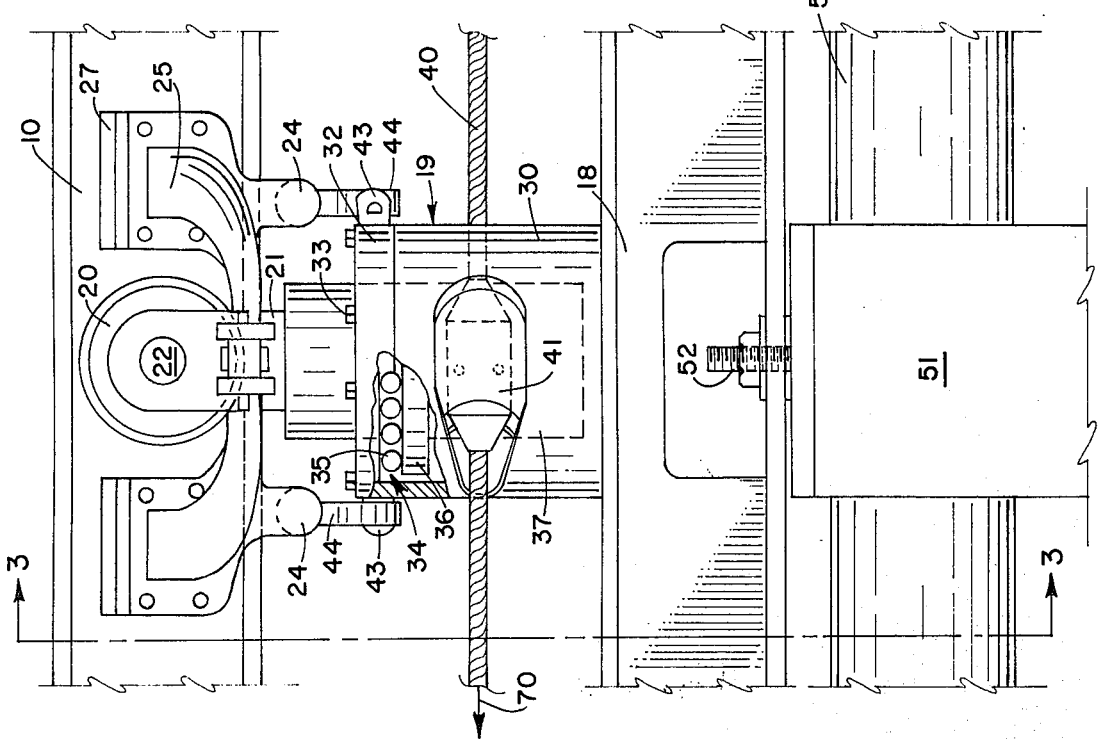
FIG. 2 is a side view of the monorail and a partial view of the beam support system.

Cable 40 is being pulled along and through each of the cylindrical mounts 19 which are in storage positions illustrated by loops 60. Dogs 41 will pass through tapered opening 31 in outer shell 30 and holes 38a and 38b in inner mount 37. As additional pull is being applied to hoses 55 and 57, beam 18 will rotate until cam actuators 43 engage arms 44. When this occurs, brake arms 25 will move away from the side walls of monorail 10 freeing roller 20 for movement along monorail 10. The beam will continually assume a smaller angle as it moves, for example, that shown in position 63 and 64, until the beam is substantially parallel with the axis of monorail 10 as illustrated by position 65, FIG. 6. Once the angle of beam 18 has sufficiently rotated, tapered opening 31 will trap dog 41 inside cylindrical mount 19 (see FIGS. 2 and 3). Bearing 34 permits freedom of rotation along with support between inner mount 37 and cylindrical mount 19. When the system is rotated back to a storage position as illustrated in FIG. 7 or loops 60 of FIG. 6, cable 40 is pulled in the direction of arrow 70 as illustrated in FIG. 2. The dog 41 will prevent the cable from slipping through cylindrical mount 19 thereby applying the retraction force from the cable to the cylindrical mount 19 and not to the hose system. When the beams 18 are rotated sufficiently, cable 40 will slip out of tapered opening 31 transferring the tension to the next succeeding cylindrical mount 19. At that position cam actuators 43 will move away from arms 44 causing spring 23 to bias arms 25 against the side walls of monorail 10.

Figure 8:
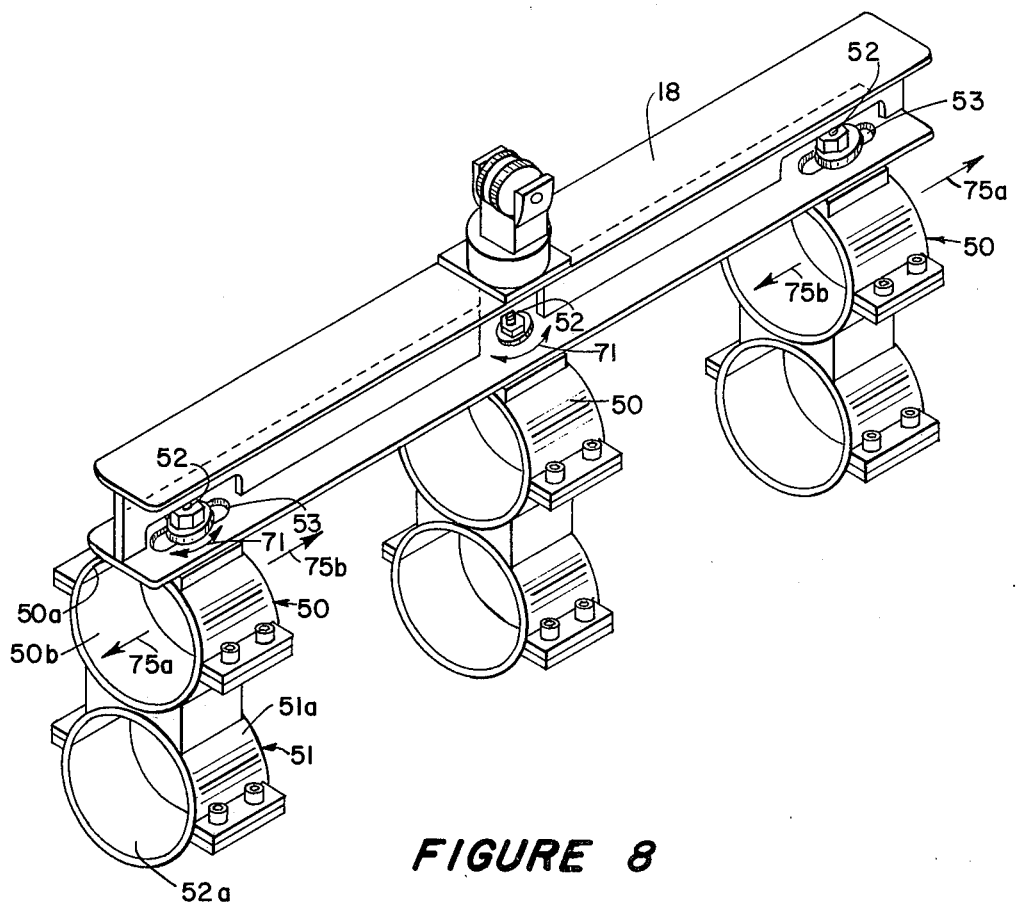

Referring in particular to FIG. 8, it is noted that clamp 50 is pivotly attached through bolt 52 to I beam 18. The pivotal attachment permits rotation as illustrated by arrow 71. The aforementioned rotation will prohibit crimping of the hose when it assumes an angular storage position such as that illustrated at location 72 of FIG. 7. The end clamps 50 are not only pivotly attached through bolts 52 so that they can rotate as illustrated by arrows 71, but also can slide as illustrated by arrows 75a or 75b. Both pivotal and sliding action are required to accommodate a change in the length of hose between center mount 50 and end mounts 50 in the storage position as compared to the use position when the hoses tend to loop during the stored position and when hoses elongate with increasing pressure. See for example loop 80 in FIG. 7.

This system has been described with respect to a particular use, namely the support of a plurality of hoses in a slurry transportation system, particularly when it is mounted for use in a mine. It is obvious that the system can be used at any location and a single or more than two hoses can be supported. Furthermore, the flexible members can be any apparatus as for example air tubes, electrical wires, etc. A single illustration has been given for restraining movement of the cylindrical mount 19. It is obvious that other systems can be incorporated, for example a spacer can be mounted along monorail 10. The spacer can be attached to cylindrical mount 19, U-shaped mount 21 or could even be free and movably supported to monorail 10. Such a support system would prevent the mounts 19 from being forced too close together thereby causing crimping of the hose during the storage position. A particular system has also been illustrated for locking the cable to mount 19. Other systems can be devised which are well within the skill of the art for accomplishing the same purpose.

Thus, having described the invention in detail, it will be understood by those skilled in the art that certain variations and modifications may be made without departing from the spirit and scope of the invention as defined herein and in the appended claims.

I claim:

1. In an overhead support apparatus for a slurry hose transportation system which includes a rail member anchored to a support means a predetermined distance above the floor, a plurality of spaced roller means movably engaged with and supported by said rail member and slurry hose means for attachment to said plurality of spaced roller means, a rigid beam support system comprising:
   a. at least one beam, each said beam having first and second ends;
   b. means for pivotally attaching each said beam intermediate said ends to a corresponding one of said plurality of spaced roller means; and
   c. a plurality of slurry hose clamping means for pivotally attaching said slurry hose means to each of said beams; said rigid beam support system being so constructed and arranged that said at least one beam supports said slurry hose means above the floor and substantially parallel to the floor when in storage and, alternately, when in use.

2. An apparatus as described in claim 1 including storage restraining means attached to said roller means for operatively engaging said support means so that when said beams are supporting said slurry hose means in storage and the axis of said beam is substantially normal to the longitudinal axis of said rail member said roller means is restrained from movement along said rail member, and, alternately, for releasing said support means when said slurry hose means rotates said beam axis toward alignment with said rail member longitudinal axis permitting movement of said roller means along the longitudinal axis of said rail member.

3. An apparatus as described in claim 2 including cable means for operatively connecting each of said plurality of spaced roller means and means for operatively securing said cable means to each of said roller means after a predetermined length of said cable means has passed each of said roller means.

4. An apparatus as described in claim 1 wherein each beam includes a slurry hose clamping means for pivotally attaching said slurry hose means adjacent each of said first and second ends thereof, each said pivotal attachment additionally providing slidable movement along the longitudinal axis of said beam.

5. An apparatus for supporting an elongated flexible member above the surface of the earth comprising:
   a. a monorail;
   b. a support means for mounting said monorail a predetermined distance above the surface of the earth;
   c. a plurality of spaced roller means engaging said monorail and supported thereby;
   d. a horizontal support means disposed adjacent said roller means;
   e. means for pivotally attaching said horizontal support means to said roller means;
   f. at least one flexible member support means disposed adjacent said horizontal support means;
   g. means for rigidly securing a plurality of said flexible member support means at spaced locations to said flexible member and pivotally securing said flexible member support means to said horizontal support means;
   h. cable means disposed adjacent said horizontal support means; and
   i. cable securing means on said means for pivotally attaching said horizontal support means for engaging said cable means and pulling each of said horizontal support means into storage position.

* * * * *